United States Patent
Yang

(10) Patent No.: US 8,973,649 B2
(45) Date of Patent: Mar. 10, 2015

(54) HEAT EXCHANGE APPARATUS WITH A ROTATING DISK AND AUTOMATIC CONTROL OF HEAT EXCHANGE BETWEEN TWO FLUID STREAMS BY MODULATION OF DISK ROTATING SPEED AND/OR FLOW RATE

(76) Inventor: Tai-Her Yang, Dzan-Hwa (TW)

( * ) Notice: Subject to any disclaimer, the term of this patent is extended or adjusted under 35 U.S.C. 154(b) by 1363 days.

(21) Appl. No.: 12/318,197

(22) Filed: Dec. 23, 2008

(65) Prior Publication Data
US 2010/0155045 A1    Jun. 24, 2010

(51) Int. Cl.
F23L 15/02    (2006.01)
F28D 17/00    (2006.01)
F28F 27/00    (2006.01)
F24F 3/14     (2006.01)

(52) U.S. Cl.
CPC ....... *F24F 3/1417* (2013.01); *F24F 2203/1004* (2013.01); *F24F 2203/1032* (2013.01); *F24F 2203/1068* (2013.01); *F24F 2203/1084* (2013.01)
USPC ............ 165/200; 165/4; 165/7; 165/8; 165/9; 165/11.1; 165/201

(58) Field of Classification Search
USPC ............... 165/4, 7, 8, 9, 10, 11.1, 200, 201, 6
See application file for complete search history.

(56) References Cited

U.S. PATENT DOCUMENTS

| | | | |
|---|---|---|---|
| 3,672,128 A * | 6/1972 | Heffron | 165/7 |
| 3,774,374 A * | 11/1973 | Dufour et al. | 165/7 |
| 4,467,785 A * | 8/1984 | Langford et al. | 165/10 |
| 4,754,806 A * | 7/1988 | Astle, Jr. | 165/6 |
| 4,813,632 A * | 3/1989 | Woodhouse | 165/7 |
| 4,840,220 A * | 6/1989 | Umezu et al. | 165/10 |
| 4,903,756 A * | 2/1990 | Monro | 165/8 |
| 4,952,283 A * | 8/1990 | Besik | 165/4 |
| 5,039,006 A * | 8/1991 | Habegger | 236/11 |
| 5,044,424 A * | 9/1991 | Monro | 165/10 |
| 5,285,842 A * | 2/1994 | Chagnot | 165/7 |
| 5,394,934 A * | 3/1995 | Rein et al. | 165/200 |
| 5,477,913 A * | 12/1995 | Polk et al. | 165/11.1 |
| 5,540,273 A * | 7/1996 | Polk et al. | 165/11.1 |
| 5,560,350 A * | 10/1996 | Kim | 165/7 |
| 5,562,089 A * | 10/1996 | Astle, Jr. | 165/8 |
| 5,660,048 A * | 8/1997 | Belding et al. | 165/7 |
| 5,791,400 A * | 8/1998 | Brzytwa et al. | 165/8 |
| 5,793,296 A * | 8/1998 | Lewkowicz | 340/632 |
| 5,983,986 A * | 11/1999 | Macintyre et al. | 165/9 |
| 6,062,296 A * | 5/2000 | Broberg | 165/6 |
| 6,076,593 A * | 6/2000 | Takagi et al. | 165/201 |
| 6,091,061 A * | 7/2000 | Dreisler et al. | 165/8 |
| 6,119,764 A * | 9/2000 | Karlsson et al. | 165/8 |
| 6,141,979 A * | 11/2000 | Dunlap | 165/8 |

(Continued)

*Primary Examiner* — Ljiljana Ciric
(74) *Attorney, Agent, or Firm* — Bacon & Thomas, PLLC

(57) ABSTRACT

A rotary type heat exchange apparatus with automatic flow rate exchange modulation includes unidirectional pumps for pumping fluid through a heat exchange rotating disk in two different directions. The heat exchange apparatus may further be installed with at least one temperature detecting device, humidity detecting device and/or gaseous or liquid state fluid composition detecting device for generating temperature, humidity, and/or composition detection signals. The temperature humidity, and/or composition detection signals may be used as references for modulating the pumping flow rate of exchange fluid, or for modulating the operating timing of the fluid flow by controlling the rotating speed of the heat exchange rotating disk.

16 Claims, 4 Drawing Sheets

(56) References Cited

U.S. PATENT DOCUMENTS

| | | | |
|---|---|---|---|
| 6,209,622 B1* | 4/2001 | Lagace et al. | 165/8 |
| 6,415,859 B1* | 7/2002 | Kametani et al. | 165/7 |
| 6,575,228 B1* | 6/2003 | Ragland et al. | 165/8 |
| 6,889,750 B2* | 5/2005 | Lagace et al. | 165/8 |
| 6,959,875 B2* | 11/2005 | Yabu et al. | 165/7 |
| 7,073,566 B2* | 7/2006 | Lagace et al. | 165/8 |
| 7,389,646 B2* | 6/2008 | Moffitt | 165/8 |
| 7,809,472 B1* | 10/2010 | Silva et al. | 165/200 |
| 7,841,381 B2* | 11/2010 | Chagnot et al. | 165/8 |
| 7,849,913 B2* | 12/2010 | Struensee | 165/9 |
| 8,267,164 B2* | 9/2012 | Lestage et al. | 165/200 |
| 8,651,171 B2* | 2/2014 | Yang | 165/200 |
| 8,726,979 B2* | 5/2014 | Yang | 165/200 |
| 8,739,536 B2* | 6/2014 | Canal et al. | 165/10 |
| 8,740,613 B1* | 6/2014 | Friend | 165/4 |
| 2001/0013404 A1* | 8/2001 | Lagace et al. | 165/8 |
| 2006/0219381 A1* | 10/2006 | Lagace et al. | 165/8 |
| 2011/0048670 A1* | 3/2011 | Podhorsky et al. | 165/4 |

* cited by examiner

HEAT EXCHANGE APPARATUS WITH A ROTATING DISK AND AUTOMATIC CONTROL OF HEAT EXCHANGE BETWEEN TWO FLUID STREAMS BY MODULATION OF DISK ROTATING SPEED AND/OR FLOW RATE

BACKGROUND OF THE INVENTION (a) Field of the Invention

The present invention improves the conventional rotary type double flow path heat exchange apparatus by providing automatic exchange fluid flow rate modulation so as to timely change the temperature distribution between a fluid and a heat exchange rotating disk, or to modulate the composition ratio of the gaseous or liquid state pumping fluid. The heat exchange rotating disk inside the rotary type heat exchange apparatus is coated with penetrating or absorbing type moisture absorbing material, the penetrating or absorbing type moisture absorbing material is inserted into the rotating disk, or the heat exchange rotating disk itself has a concurrent dehumidification function to provide the dehumidification effect of the total heat exchange function.

(b) Description of the Prior Art

A conventional double flow path heat reclaiming device or total heat reclaiming device through which a gaseous or liquid state pumping fluid is passed includes:

(1) A fixed type fluid heat reclaiming device;
(2) A fixed type fluid total heat reclaiming device;
(3) A rotary type fluid heat reclaiming device; and
(4) A rotary type fluid total heat reclaim device.

Such heat reclaiming devices are usually selected to operate at a set flow speed, and as a result their heat exchange efficiency is affected by the temperature difference between input and output sides, by the fluid composition difference between the spaces of the exchange gaseous or liquid state fluids, or by the difference in fluid speeds and the temperature difference between the spaces of the exchange gaseous or liquid state fluids. Further, conventional heat exchangers are unable to modulate the heat exchange flow rate so as to modulate the fluid composition difference between the spaces of the exchange gaseous or liquid state fluids, or to provide an automatic modulation function to proactively modulate the heat exchange flow rate, thereby achieving an energy saving effect by matching the temperature difference or humidity difference.

SUMMARY OF THE INVENTION

The present invention concerns an improvement in which the conventional rotary type double flow path heat exchange apparatus utilizes automatic exchange fluid flow rate modulation achieved through control of the rotating disk or rotating disk driving device to thereby modulate the flow rate, temperature distribution, humidity distribution, and gaseous or liquid state compositions of the exchange fluid.

DESCRIPTION OF MAIN COMPONENT SYMBOLS

Figure 1:
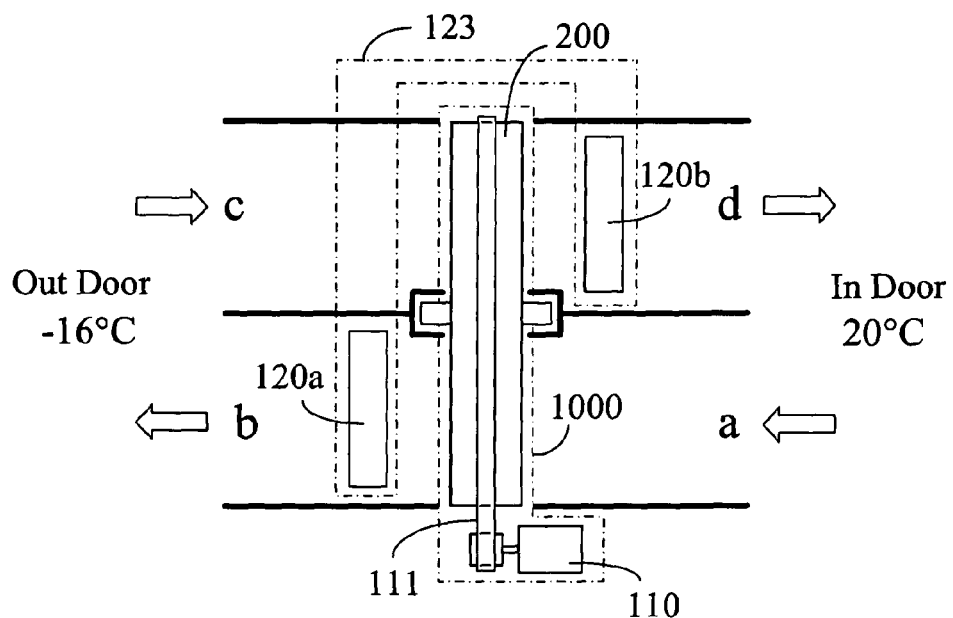
FIG. 1 is a schematic view showing the operating principles of the conventional rotary type total heat exchange apparatus.

11: Temperature detecting device
21: Humidity detecting device
31: Gaseous or liquid state fluid composition detecting device
100: Rotary type heat exchange rotating disk
110: Rotating disk rotationally driving device
111: Variable speed transmission device
120a' 120b: Unidirectional fluid pump
123: Double flow path fluid pumping device
130: Heater
200: Rotary type total heat exchange rotating disk
300: Power source
250: Operative control device
1000: Rotary type heat exchange apparatus
a, b, c, d: Fluid port

DETAILED DESCRIPTION OF THE PREFERRED EMBODIMENTS

Figure 2:
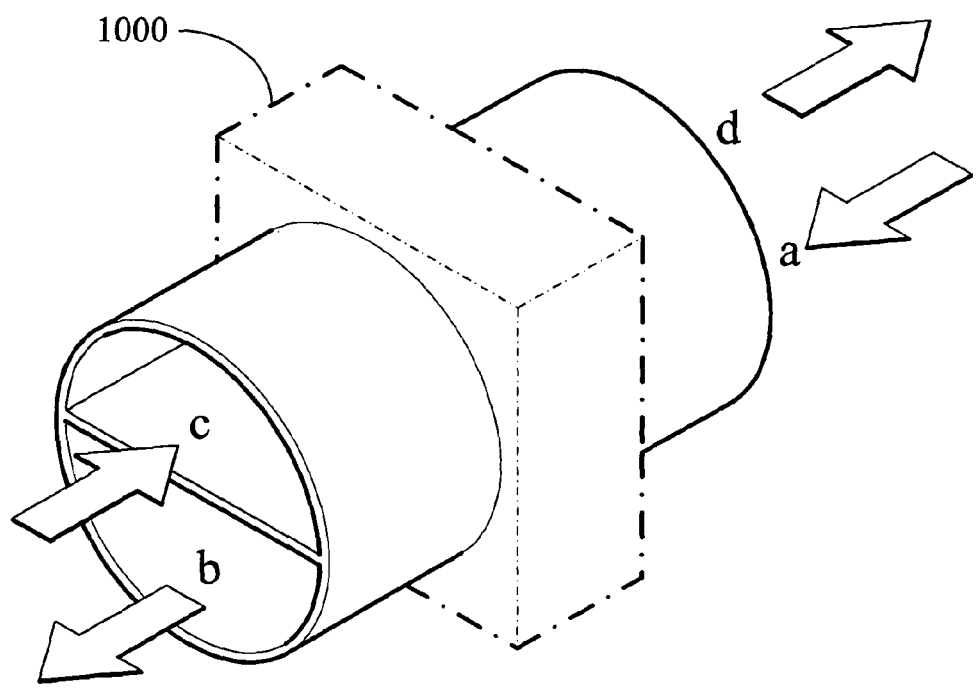
FIG. 2 is a schematic view of the conventional rotary type total heat exchange apparatus having two fluid streams in different flow directions to pass through different positions of the rotary type total heat exchange rotating disk.

The warming energy reclaiming effectiveness of the conventional rotary type total heat exchange apparatus or other rotary type heat exchange apparatus has a very wide range of applications. FIG. 1 is a schematic view of a typical such rotary type total heat exchange apparatus. As shown in FIG. 1, the conventional rotary type total heat exchange apparatus is usually installed with two fluid pumping devices for pumping different-temperature fluid streams in different flow directions and four fluid ports for pumping the two fluid streams in different flow directions through the two sides of the rotary type total heat exchange rotating disk (200) inside the conventional total heat exchange apparatus. The two fluid streams are respectively pumped in through the two fluid ports at different sides and are respectively discharged through the fluid ports at the respective other sides, with the two fluid paths being segregated to pass through the rotationally driven rotary type total heat exchange rotating disk (200) at different positions. FIG. 2 is a different schematic view showing the manner in which the two fluid streams in the conventional rotary type total heat exchange apparatus flow in different directions to pass through different positions of the rotary type total heat exchange rotating disk (200) of FIG. 1, which is included in in the heat exchange apparatus (1000). Taking the example of a heat exchange apparatus for indoor to outdoor air exchange in winter times, the indoor higher temperature air flow is pumped into the conventional rotary type total heat exchange apparatus via the fluid port (a), and passes through the fluid path of the rotary type total heat exchange rotating disk (200) on one side, and then is discharged to the outside via the fluid port (b), and the lower temperature outdoor fresh air is pumped into the conventional rotary type total heat exchange apparatus via the fluid port (c) from the outside, passes through the fluid path of the rotary type total heat exchange rotating disk (200) on the other side, and then is discharged indoors via the fluid port (d). The fluid port (a) and the fluid port (d) are disposed at the side passing to the inside, while the fluid port (c) and the fluid port (b) are disposed at the side passing to the outside. During stable operation, one side of the rotary type total heat exchange rotating disk (200) in the conventional rotary type total heat exchange apparatus between the fluid port (a) and the fluid port (b) forms a temperature distribution in which the higher temperature at the fluid port (a) gradually reduces to the lower temperature at the fluid port (b), and the other side of the rotary type total heat exchange rotating disk (200) between the fluid port (c) and the fluid port (d) forms a temperature distribution in which the lower temperature at the fluid port (c) gradually increases to the higher temperature at the fluid port (d). The heat exchange efficiency is determined by the fluid property, flow speed and characteristics of the heat exchange rotating disk in the heat exchange apparatus as well as the temperature difference between the fluids at the two sides. If the heat exchange rotating disk is situated in the path of a gaseous state fluid flow and insertingly installed or coated with a penetrating or absorbing type moisture absorbing material or the heat exchange rotating disk itself has a dehumidification function, then the two fluid streams in different flow directions have a stable temperature difference and humidity saturation difference at the two inlet/outlet ends and the two sides of the rotary type total heat exchange rotating disk (200).

The present invention modifies the above-described conventional rotary type double flow path heat exchange apparatus to further have an automatic exchange fluid flow rate modulation function that automatically modulate the flow rate, temperature distribution, humidity distribution, and gaseous or liquid state compositions of the exchange fluid.

Figure 3:
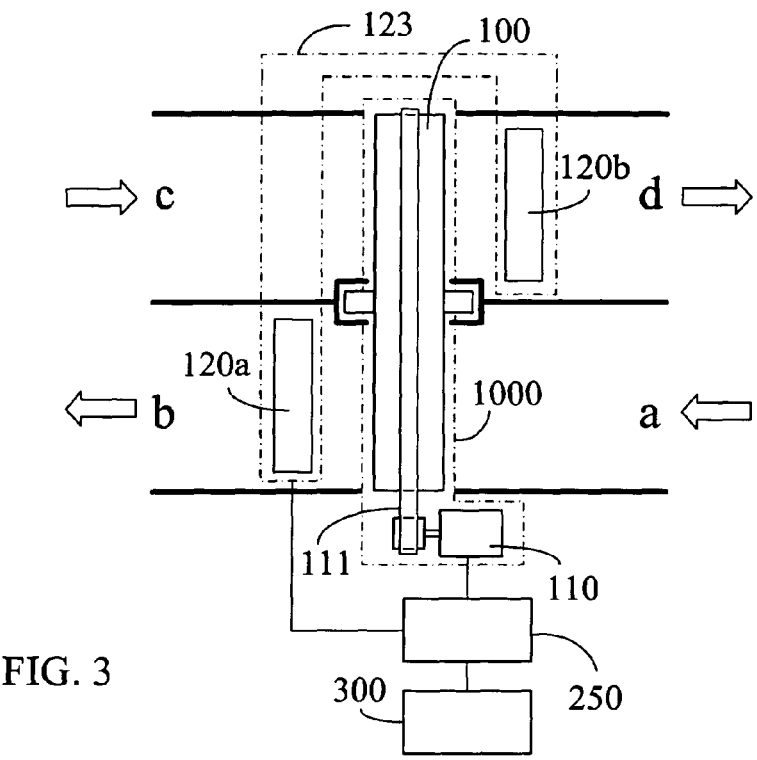
FIG. 3 is a block diagram of an embodiment of the present invention that is capable of automatically controlling the flow rate of heat exchange fluid.

FIG. 3 is a block diagram of an embodiment capable of automatically controlling the flow rate of heat exchange fluid.

In the embodiment of FIG. 3 is fluid port (b) and fluid port (d), among the fluid port (a), fluid port (b), fluid port (c), and fluid port (d) of the double flow path of the rotary type heat exchange apparatus (1000), are respectively installed with unidirectional fluid pumps (120a)(120b) capable of producing negative pressure or positive pressure and collectively referred to by the term double flow path fluid pumping device (123). The unidirectional fluid pumps are provided with power by a power source (300) and operatively controlled by an operative control device (250) to cause the unidirectional fluid pumps (120a)(120b) of the double flow path fluid pumping device (123) to produce negative pressure or positive pressure for pumping the two fluids through the rotary type heat exchange rotating disk (100) in different areas and different flow directions, and the flow paths of the two fluid streams being mutually isolated. In addition, the heat exchange apparatus of the embodiment of FIG. 3 has at least one of the following characteristics:

The rotary type heat exchange apparatus (1000) and the unidirectional fluid pumps (120a)(120b) capable of producing negative pressure or positive pressure can be integrally combined or separately installed to constitute the double flow path fluid pumping device (123) function, and the two unidirectional fluid pumps (120a)(120b) capable of producing negative pressure or positive pressure are respectively installed to the fluid port (b) and the fluid port (d) so as to pump the fluid in different pumping flow directions. The two unidirectional fluid pumps (120a)(120b) capable of producing negative pressure or positive pressure are respectively driven by an electric motor individually or are commonly driven by the same motor, and are operatively controlled by the operative control device (250) to operate in one or more than one of the following functional modes: 1) the two unidirectional fluid pumps (120a)(120b) are pumped in negative pressure for pumping the two fluid streams in different pumping flow directions; and 2) the two unidirectional fluid pumps (120a)(120b) are pumped in positive pressure for pumping the two fluid streams in different pumping flow directions. In the two functional modes 1) and 2), the two fluid streams are pumped to pass through different areas of the rotary type heat exchange rotating disk (100), the flow paths of the two fluid streams are mutually isolated, and the flow directions of the two fluid streams are contrary to each other.

The double flow path fluid pumping device (123) is constituted by at least two unidirectional fluid pumps (120a)(120b), and the fluid port (b) and the fluid port (d) among the fluid port (a), fluid port (b), fluid port (c), and fluid port (d) of the double flow path installed within the rotary type heat exchange apparatus (1000) are respectively installed with the unidirectional fluid pumps (120a)(120b), which are capable of producing negative or positive pressure to constitute the double flow path fluid pumping device (123). The operative control device (250) operatively controls the flow rate of the heat exchange fluid pumped by the double fluid path fluid pumping device (123) driven by the power source (300) by controlling the rotating speed of the rotary type heat exchange rotating disk (100) driven by the rotating disk driving device (110).

The power source (300) may include an AC or DC city power system or independent power supply device to provide a power source for the operation of the rotary type heat exchange apparatus with automatic exchange flow rate modulation.

The operative control device (250) is constituted by electromechanical components, solid state electronic components, or microprocessors, related software, and operative control interfaces to operatively control the unidirectional fluid pumps (120a)(120b) of the double flow path fluid pumping device (123) by: 1) operatively controlling the switching functional operation; or 2) operatively controlling the flow rate of pumping heat exchange fluid; or 3) operatively controlling the temperature distribution status between the fluid and the rotary type heat exchange disk (100); or 4) operatively controlling the rotating speed of the rotary type heat exchange disk (100) driven by the rotating disk driving device (110); or 5) integrally operatively controlling at least two of items 1), 2), 3), and 4) in combination.

The rotating disk driving device (110) is constituted by an electric motor or other rotational power source with a variable speed transmission device (111) for driving the rotary type heat exchange rotating disk (100) to rotate and modulating its rotating speed to change its heat exchange characteristics.

The rotary type heat exchange rotating disk (100) is rotationally driven by the rotating disk driving device (110), is internally provided with two porous fluid path areas for passing through different directional fluid flows, and has a heat absorbing or dissipating function. The two fluid paths of the rotary type heat exchange disk are respectively provided with two fluid ports for respectively pumping two fluid streams, the passage of the two fluid streams being mutually isolated, thereby allowing the fluids in different flowing directions to pass through the rotary type heat exchange rotating disk (100) as it is rotationally driven by the rotating disk driving device (110) during heat exchange operations.

The timing to operatively control the flow rate of heat exchange fluid and/or the rotating speed of rotary type heat exchange rotating disk (100) driven by rotating disk rotationally driving device (110) may be such that: 1) the fluid flow rate and change timing are preset in an open loop operative control; or 2) the timing may be randomly manually controlled;

The unidirectional fluid pump (120a) and unidirectional fluid pump (120b) can also be installed to the fluid ports (a)(d) or installed to the fluid ports (b)(c) in the embodiment of FIG. 3, with one unidirectional fluid pump being pumped in positive pressure while the other unidirectional fluid pump is pumped in negative pressure so as to allow the two fluid streams to pass through the rotary type heat exchange rotating disk (100) in different pumping flow directions.

Figure 4:
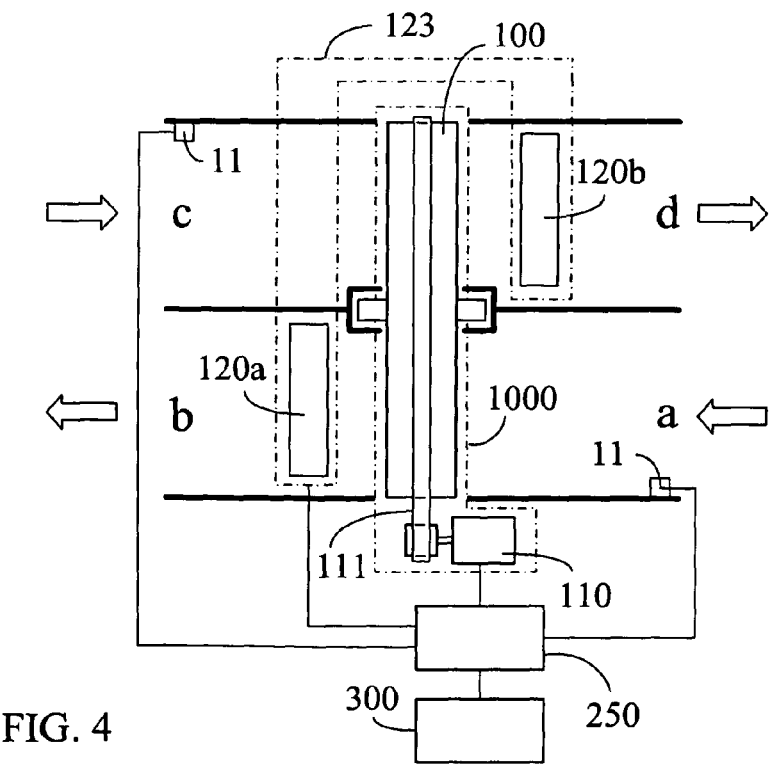
FIG. 4 is a block diagram of an embodiment of the present invention that is further installed with a temperature detecting device to control the flow rates of the heat exchange fluids.

FIG. 4 is a block diagram of an embodiment that is further installed with a temperature detecting device to operatively control the flow rates of the heat exchange fluids.

As shown in FIG. 4, the fluid port (b) and fluid port (d) among the fluid port (a), fluid port (b), fluid port (c), and fluid port (d) of the double flow path of the rotary type heat exchange apparatus (1000) are respectively installed with the unidirectional fluid pumps (120a)(120b) capable of producing negative pressure or positive pressure to constitute the double flow path fluid pumping device (123) and driven through the power provided by power source (300) under control of the operative control device (250) to produce the negative pressure or positive pressure for pumping the two fluids through the rotary type heat exchange rotating disk (100) in different areas and different flow directions, the flow paths of the two fluid streams being mutually isolated. In this embodiment:

The rotary type heat exchange apparatus (1000) and the unidirectional fluid pumps (120a)(120b) capable of producing negative pressure or positive pressure can be integrally combined or separately installed to constitute the double flow path fluid pumping device (123), and the two unidirectional fluid pumps (120a)(120b) capable of producing negative pressure or positive pressure are respectively installed to the fluid port (b) and the fluid port (d) so as to pump the fluid in different pumping flow directions. The two unidirectional fluid pumps (120a)(120b) capable of producing negative pressure or positive pressure may be driven by the electric motor individually or commonly driven by the same motor, and are operatively controlled by the operative control device (250) to operate in one or more than one of the following functional modes, in which: 1) the two unidirectional fluid pumps (120a)(120b) are pumped in negative pressure for pumping the two fluid streams in different pumping flow directions; or 2) the two unidirectional fluid pumps (120a)(120b) are pumped in positive pressure for pumping the two fluid streams in different pumping flow directions. In the two functional modes 1) and 2), the two fluid streams are pumped to pass through different areas of the rotary type heat exchange rotating disk (100), the flow paths of the two fluid streams are mutually isolated, and the flow directions of the two fluid streams are contrary to each other.

At least one temperature detecting device (11) is installed at a position capable of directly or indirectly detecting the temperature variation of the pumping exchange fluid, and a detected temperature signal is referred for operative control timing by the operative control device (250) to provide the following control functions: 1) operatively controlling the flow rate of the exchange fluid pumped by the double flow path fluid pumping device (123); 2) operatively controlling the rotating speed of the rotary type heat exchange rotating disk (100) driven by the rotating disk driving device (110); or 3) operatively controlling items 1) and 2) simultaneously.

The double flow path fluid pumping device (123) may be constituted by at least two unidirectional fluid pumps (120a)(120b), wherein the fluid port (b) and fluid port (d) among the fluid port (a), fluid port (b), fluid port (c), and fluid port (d) of the double flow path installed within the rotary type heat exchange apparatus (1000) are respectively installed with unidirectional fluid pumps (120a)(120b) capable of producing negative or positive pressure to constitute the double flow path fluid pumping device (123). The operative control device (250) controls the flow rate of the heat exchange fluid pumped by the double fluid path fluid pumping device (123) driven by the power source (300), and/or controls the rotating speed of the rotary type heat exchange rotating disk (100) driven by the rotating disk driving device (110).

The power source (300) may obtain power from an AC or DC city power system or an independent power supply device to provide power for operation of the rotary type heat exchange apparatus with automatic exchange flow rate modulation.

The operative control device (250) is constituted by electromechanical components, solid state electronic components, or microprocessors, related software, and operative control interfaces to operatively control the unidirectional fluid pumps (120a)(120b) of the double flow path fluid pumping device (123) by: 1) operatively controlling the switching functional operation; 2) operatively controlling the flow rate of pumping heat exchange fluid; 3) operatively controlling the temperature distribution between the fluid and the rotary type heat exchange rotating disk (100); 4) operatively controlling the rotating speed of the rotary type heat exchange rotating disk (100) driven by the rotating disk driving device (110); or 5) integrally operatively controlling at least two of items 1), 2), 3), and 4) in combination.

The rotating disk driving device (110) is constituted by an electric motor or other rotational power source with a variable speed transmission device (111) for driving the rotary type heat exchange rotating disk (100) to rotate and modulating its rotating speed to change its heat exchange characteristics.

The rotary type heat exchange rotating disk (100) is rotationally driven by the rotating disk rotationally driving device (110), is internally provided with two porous fluid path areas for passing through different directional fluid flows, and has a heat absorbing or dissipating function. The two fluid paths of the rotary type heat exchange rotating disk are respectively provided with two fluid ports for respectively pumping two fluid streams, wherein the two fluid flow paths are mutually isolated, thereby allowing the fluids in different flowing directions to pass through the rotary type heat exchange rotating disk (100) rotationally driven by the rotating disk driving device (110) for heat exchange function operations.

The timing to operatively control the flow rate of heat exchange fluid and/or the rotating speed of rotary type heat exchange rotating disk (100) driven by rotating disk rotationally driving device (110) may include any of the following: 1) the fluid flow rate and change timing are preset in an open loop operative control; 2) the timing is randomly manually controlled; or 3) The at least one temperature detecting device (11) is installed at a position capable of directly or indirectly detecting the temperature variation, the temperature detection signals provided by the temperature detecting device (11) being referred to determine the operating timing for controlling the flow rate of the pumping exchange fluid and/or the rotating speed of the rotary type heat exchange rotating disk (100) driven by the rotating disk driving device (110).

The unidirectional fluid pump (120a) and unidirectional fluid pump (120b) can also be installed to the fluid ports (a)(d) or installed to the fluid ports (b)(c) in the embodiment of FIG. 4, wherein one unidirectional fluid pump is pumped in positive pressure while the other unidirectional fluid pump is pumped in negative pressure so as to allow the two fluid streams to pass through the rotary type heat exchange rotating disk (100) in different pumping flow directions.

Figure 5:
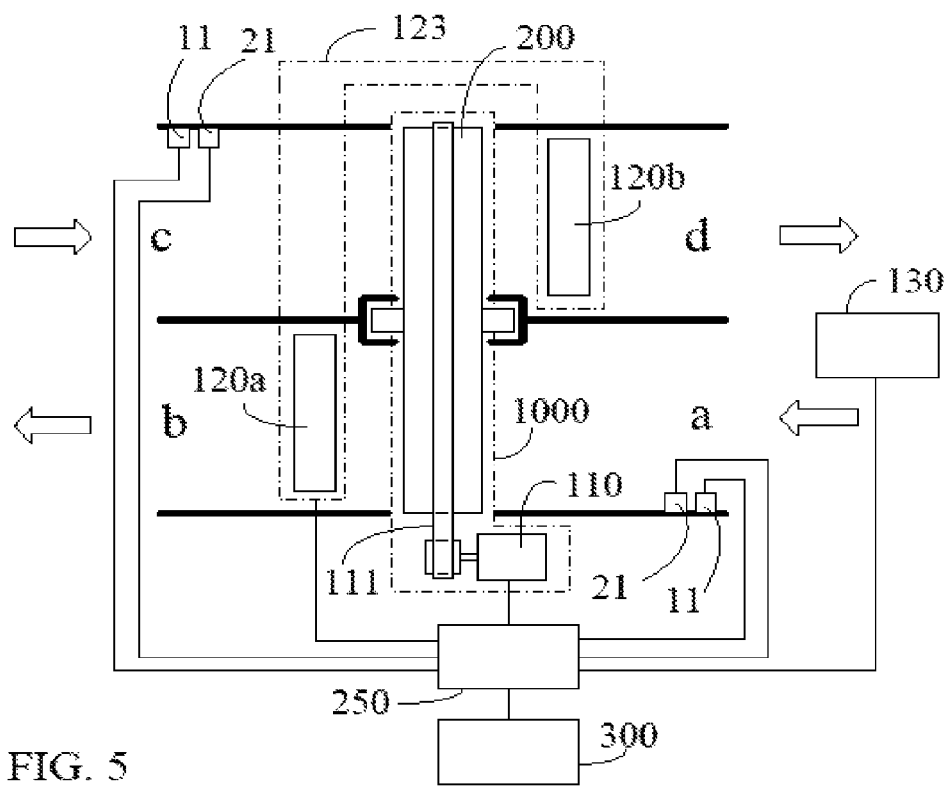
FIG. 5 is a block diagram of the the present invention that is further installed with a temperature detecting device and a humidity detecting device to control the flow rates of the total heat exchange fluids.

FIG. 5 is a block diagram of an embodiment that is further installed with a temperature detecting device and a humidity detecting device to operatively control the flow rates of the total heat exchange fluid.

As shown in FIG. 5, the fluid port (b) and fluid port (d) among the fluid port (a), fluid port (b), fluid port (c), and fluid port (d) of the double flow path of the rotary type heat exchange apparatus (1000) are respectively installed with the unidirectional fluid pumps (120a)(120b) capable of producing negative pressure or positive pressure to constitute the double flow path fluid pumping device (123). Operative control device (250) controls the unidirectional fluid pumps (120a)(120b) to produce negative pressure or positive pressure upon being driven by the power source (300), to pump the two fluid streams through the rotary type total heat exchange rotating disk (200) in different areas, the flow directions of the two fluid streams being different and mutually isolated. In this embodiment:

The rotary type heat exchange apparatus (1000) and the unidirectional fluid pumps (120a)(120b) capable of producing negative pressure or positive pressure can be integrally combined or separately installed to constitute the double flow path fluid pumping device (123). The two unidirectional fluid pumps (120a)(120b) capable of producing negative pressure or positive pressure are respectively installed to the fluid port (b) and the fluid port (d) so as to pump the fluid in different pumping flow directions, and are individually driven by an electric motor or commonly driven by the same motor under control of the operative control device (250) to operate in one or more than one of the following functional modes, in which: 1) the two unidirectional fluid pumps (120a)(120b) are pumped in negative pressure for pumping the two fluid streams in different pumping flow directions; or 2) the two unidirectional fluid pumps (120a)(120b) are pumped in positive pressure for pumping the two fluid streams in different pumping flow directions. In the two functional mode operations, the two fluid streams are pumped to pass through different areas of the rotary type total heat exchange rotating disk (200), the flow paths of the two fluid streams are mutually isolated, and the flow directions of the two fluid streams are contrary to each other.

At least one temperature detecting device (11) and at least one humidity detecting device (21) are installed at positions capable of directly or indirectly detecting the temperature and humidity variations of the pumping exchange fluid, wherein the temperature and humidity detection signals are are used for operating timing by the operative control device (250) in one of the following modes: 1) operatively controlling the flow rate of the exchange fluid pumped by the double flow path fluid pumping device (123); 2) operatively controlling the rotating speed of the rotary type total heat exchange rotating disk (200) driven by a rotating disk driving device (110); or 3) operatively controlling items 1) and 2) simultaneously, the temperature detecting device (11) and humidity detecting device (21) being integrally combined or individually separately installed.

The double flow path fluid pumping device (123) is constituted by at least two unidirectional fluid pumps (120a)(120b), wherein the fluid port (b) and fluid port (d) of the double flow path installed within the rotary type heat exchange apparatus (1000) are respectively installed with the unidirectional fluid pumps (120a)(120b) being capable of producing negative or positive pressure to constitute the double flow path fluid pumping device (123), the operative control device (250) operative controlly the flow rate of the heat exchange fluid pumped by the double fluid path fluid pumping device (123) driven by the power source (300), and/or controlling the rotating speed of the rotary type total heat exchange rotating disk (200) as it is driven by the rotating disk driving device (110).

The power source (300) is a device that supplies power from an AC or DC city power system or an independent power supply device to serve as a power source for the operation of the rotary type heat exchange apparatus with automatic exchange flow rate modulation.

The operative control device (250) is constituted by electromechanical components, solid state electronic components, or microprocessors, related software, and operative control interfaces to operatively control the unidirectional fluid pumps (120a)(120b) of the double flow path fluid pumping device (123) by: 1) operatively controlling the switching functional operation; 2) operatively controlling the flow rate of pumping heat exchange fluid; 3) operatively controlling the temperature distribution status between the fluid and the rotary type total heat exchange rotating disk (200); 4) operatively controlling the humidity distribution status of the rotary type total heat exchange rotating disk (200); 5) operatively controlling the rotating speed of the rotary type total heat exchange rotating disk (200) driven by the rotating disk driving device (110); or 6) integrally operatively controlling at least two of items 1), 2), 3), 4) and 5) in combination.

The rotating disk driving device (110) is constituted by an electric motor or other rotational power source with a variable speed transmission device (111) for driving the rotary type total heat exchange rotating disk (200) to rotate and modulating its rotating speed to change its heat exchange characteristics.

The rotary type total heat exchange rotating disk (200) is rotationally driven by the rotating disk driving device (110), is internally provided with two porous fluid path areas through which different directional fluid flows, and has a heat absorbing or dissipating as well as humidity absorbing or dissipating function. The two fluid paths of the rotary type total heat exchange rotating disk (200) are respectively individually made with two fluid ports for respectively pumping two fluid streams, the two fluid flow paths being mutually isolated to allow the fluids to pass through in different flow directions when driven by the rotating disk driving device (110) for total heat exchange function operations.

The timings to operatively control the flow rate of heat exchange fluid and/or the rotating speed of rotary type total heat exchange rotating disk (200) driven by rotating disk driving device (110) are that: 1) the fluid flow rate and change timing are preset in an open loop operative control; 2) the timing is randomly manually controlled; or 3) both or at least one of the temperature detecting device (11) and humidity detecting device (21) are installed at a position capable of directly or indirectly detecting the temperature variation or humidity variation of the pumping exchange fluid, such that temperature or humidity detection signals may be referred in determining the operating timing for operatively controlling the flow rate of pumping exchange fluid and/or the rotating speed of the rotary type total heat exchange rotating disk (200) driven by the rotating disk rotationally driving device (110).

The unidirectional fluid pump (120a) and unidirectional fluid pump (120b) can also be installed to the fluid ports (a)(d) or installed to the fluid ports (b)(c) in the embodiment of FIG. 5, with one unidirectional fluid pump being pumped in positive pressure while the other unidirectional fluid pump is pumped in negative pressure so as to allow the two fluid streams to pass through the rotary type total heat exchange rotating disk (200) in different pumping flow directions.

The embodiment of FIG. 5 is further installed with a heater (130) in the fluid exchange flow path of the rotary type total heat exchange rotating disk (200) to enhance the dehumidification performance, wherein the heater is actuated by electric energy or other temperature controllable heat generating sources.

In addition, the operative control device (250) may further refer to detected values of the temperature detecting device (11) or humidity detecting device (21) to operatively control the heating timing and heating thermal energy value of the heater (130).

Figure 6:
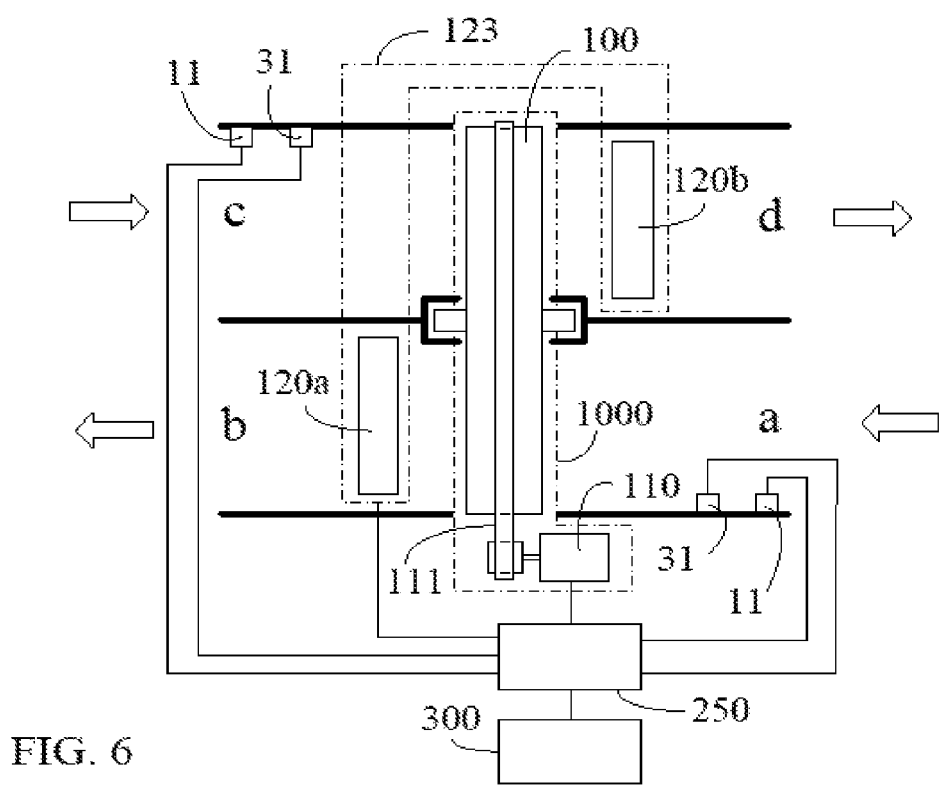
FIG. 6 is a schematic view of an embodiment of the present invention that is further installed with a temperature detecting device and a gaseous or liquid state composition detecting device to operatively control the flow rates of the heat exchange fluids.

FIG. 6 is a schematic view of an embodiment of the present invention that is further installed with a temperature detecting device and a gaseous or liquid state composition detecting device to operatively control the flow rates of the heat exchange fluids.

In the embodiment of FIG. 6, the fluid port (b) and fluid port (d) among the fluid port (a), fluid port (b), fluid port (c), and fluid port (d) of the double flow path of the rotary type heat exchange apparatus (1000) are respectively installed with unidirectional fluid pumps (120a)(120b) capable of producing negative pressure or positive pressure to constitute the double flow path fluid pumping device (123). The fluid pumps (120a)(120b) are driven through the power supplied by power source (300) and the operative control of the operative control device (250) to drive the unidirectional fluid pumps (120a) (120b) of the double flow path fluid pumping device (123) so as to pump the two fluids through the rotary type heat exchange rotating disk (100) in different flow directions, the flow paths of the two fluid streams in the different flow directions being mutually isolated. In this embodiment:

The rotary type heat exchange apparatus (1000) and the unidirectional fluid pumps (120a)(120b) capable of producing negative pressure or positive pressure can be integrally combined or separately installed to constitute the double flow path fluid pumping device (123), and are respectively installed to the fluid port (b) and the fluid port (d) so as to pump the fluid in different pumping flow directions. The two unidirectional fluid pumps (120a)(120b) may be individually driven by the electric motor or commonly driven by the same motor, and are operatively controlled by the operative control device (250) to operate in one or more than one of the following functional modes, in which: 1) the two unidirectional fluid pumps (120a)(120b) are pumped in negative pressure for pumping the two fluid streams in different pumping flow directions; or 2) the two unidirectional fluid pumps (120a) (120b) are pumped in positive pressure for pumping the two fluid streams in different pumping flow directions. In each of the two functional mode operations 1) and 2), the two fluid streams are pumped to pass through different areas of the rotary type heat exchange rotating disk (100), the flow paths of the two fluid streams are mutually isolated, and the flow directions of the two fluid streams are contrary to each other.

At least one temperature detecting device (11) and at least one gaseous or liquid state fluid composition detecting device (31) is installed at positions capable of directly or indirectly detecting the temperature variation of the pumping exchange fluid and the composition variation of the pumping gaseous or liquid state fluid, wherein the detected signals are referred for operating timing for the operative control device (250) to 1) operatively control the flow rate of the exchange fluid pumped by the double flow path fluid pumping device (123); 2) operatively control the rotating speed of the rotating speed of the rotary type heat exchange rotating disk (100) driven by the rotating disk rotationally driving device (110); or 3) operatively control items 1) and 2) simultaneously.

The temperature detecting device (11) and gaseous or liquid state fluid composition detecting device (31) may be integrally combined or individually separately installed.

The double flow path fluid pumping device (123) is constituted by at least two unidirectional fluid pumps (120a) (120b), wherein the fluid port (b) and fluid port (d) among the fluid port (a), fluid port (b), fluid port (c), and fluid port (d) of the double flow path installed within the rotary type heat exchange apparatus (1000) are respectively installed with the unidirectional fluid pumps (120a)(120b) to constitute the double flow path fluid pumping device (123), an operative control device (250) controlling the flow rate of the heat exchange fluid pumped by the double fluid path fluid pumping device (123) driven by the power source (300), and/or operative controlling the rotating speed of the rotary type heat exchange rotating disk (100) driven by the rotating disk driving device (110).

The power source (300) may be an AC or DC city power system or independent power supply device that serves as a power source for the operation of the rotary type heat exchange apparatus with automatic exchange flow rate modulation.

The operative control device (250) is constituted by electromechanical components, solid state electronic components, or microprocessors, related software, and operative control interfaces to operatively control the unidirectional fluid pumps (120a)(120b) of the double flow path fluid pumping device (123) by: 1) operatively controlling the switching functional operation; 2) operatively controlling the flow rate of pumping heat exchange fluid; 3) operatively controlling the temperature distribution between the fluid and the rotary type heat exchange rotating disk (100); 4) operatively controlling the composition interaction between the gaseous or liquid state fluids for heat exchange at the two sides of the rotary type heat exchange apparatus (1000); 5) operatively controlling the rotating speed of the rotary type heat exchange rotating disk (100) driven by the rotating disk driving device (110); or 6) integrally controlling at least two of items 1), 2), 3), 4) and 5) in combination;

The rotating disk rotationally driving device (110) may be constituted by an electric motor or other rotational power source with a variable speed transmission device (111) for driving the rotary type heat exchange rotating disk (100) to rotate and modulating its rotating speed to change its heat exchange characteristics.

The rotary type heat exchange rotating disk (100) is rotationally driven by the rotating disk rotationally driving device (110), is internally provided with two porous fluid path areas for passing through different directional fluid flows, and has heat absorbing or dissipating function, the two fluid paths of the rotary type heat exchange rotating disk being respectively individually made with two fluid ports for respectively pumping two fluid streams, and the two fluid flow paths being mutually isolated, thereby allowing the fluids in different flow directions to pass through the rotary type heat exchange rotating disk (100) when driven by the rotating disk rotationally driving device (110) for heat exchange function operations.

The timing to operatively control the flow rate of heat exchange fluid and/or the rotating speed of rotary type heat exchange rotating disk (100) driven by rotating disk rotationally driving device (110) may be provided according to at least one of the following: 1) the fluid flow rate and change timing are preset in an open loop operative control; or 2) the timing is randomly manually operatively controlled; or 3) at least one temperature detecting device (11) or at least one gaseous or liquid state fluid composition detecting device (31) is installed at a position capable of directly or indirectly detecting the temperature or composition of the pumping gaseous or liquid state fluid, the temperature or fluid composition detecting signals being used as a reference to determine the operating timing for operatively controlling the flow rate of the pumping exchange fluid or the rotating speed of the rotary type heat exchange rotating disk (100) driven by the rotating disk rotationally driving device (110).

The unidirectional fluid pump (120a) and unidirectional fluid pump (120b) can also be installed to the fluid ports (a)(d) or installed to the fluid ports (b)(c) of the embodiment of FIG. 6 such that one unidirectional fluid pump is pumped in positive pressure while the other unidirectional fluid pump is pumped in negative pressure so as to allow the two fluid streams to pass through the rotary type heat exchange rotating disk (100) in different pumping flow directions.

Figure 7:
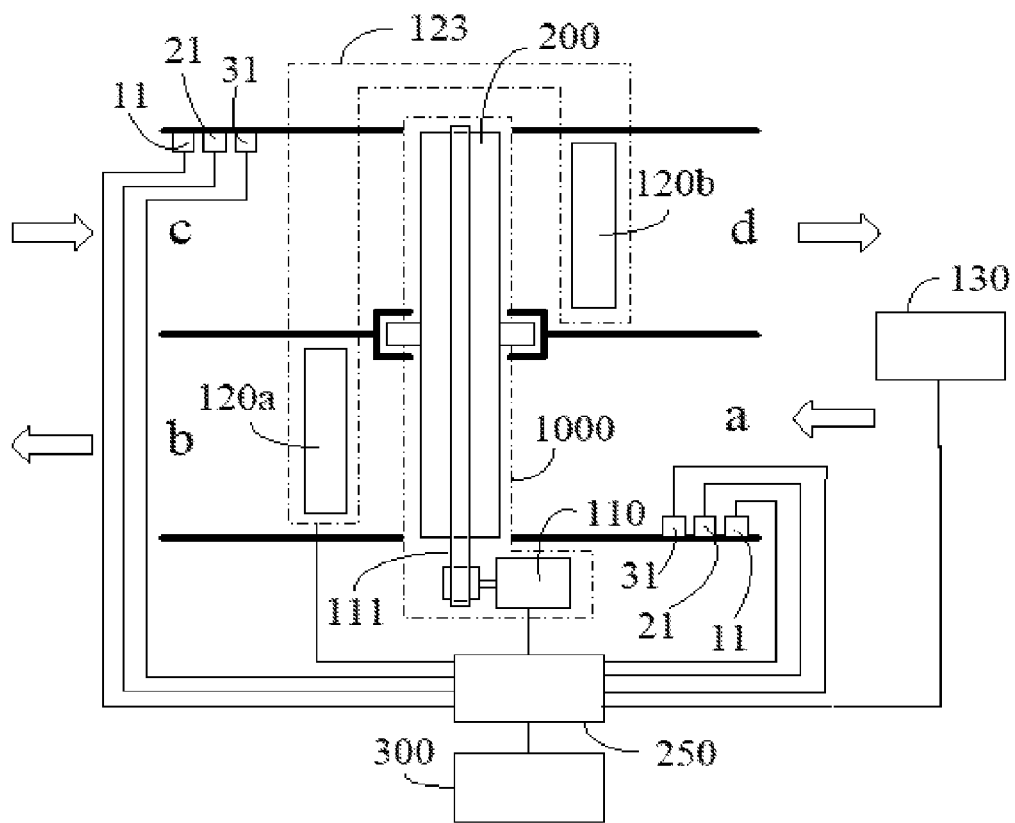
FIG. 7 is a schematic view of an embodiment of the present invention that is further installed with a temperature detecting device, humidity detecting device and gaseous or liquid state composition detecting device to operatively control the flow rates of the total heat exchange fluids.

FIG. 7 is a schematic view of an embodiment of the present invention that is further installed with a temperature detecting device, a humidity detecting device and a gaseous or liquid state composition detecting device to operatively control the flow rates of the total heat exchange fluids.

In the embodiment of FIG. 7, the fluid port (b) and fluid port (d) among the fluid port (a), fluid port (b), fluid port (c), and fluid port (d) of the double flow path of the rotary type heat exchange apparatus (1000) are respectively installed with the unidirectional fluid pumps (120a)(120b) capable of producing negative pressure or positive pressure to constitute the double flow path fluid pumping device (123). An operative control device (250) controls the unidirectional fluid pumps (120a)(120b) as they are driven by the power source (300) such that the pumping two fluid streams pass through the rotary type total heat exchange rotating disk (200) in different areas, and the flow directions of the two fluid streams are different and mutually isolated. In this embodiment:

The rotary type heat exchange apparatus (1000) and the unidirectional fluid pumps (120a)(120b) capable of producing negative pressure or positive pressure can be integrally combined or separately installed to constitute the double flow path fluid pumping device (123), and the two unidirectional fluid pumps (120a)(120b) are respectively installed to the fluid port (b) and the fluid port (d) so as to pump the fluid in different pumping flow directions. The two unidirectional fluid pumps (120a)(120b) are respectively driven by the electric motor individually or are commonly driven by the same motor, and are operatively controlled by the operative control device (250) to operate in one or more than one of the following functional modes, in which: 1) the two unidirectional fluid pumps (120a)(120b) are pumped in negative pressure for pumping the two fluid streams in different pumping flow directions; or 2) the two unidirectional fluid pumps (120a)(120b) are pumped in positive pressure for pumping the two fluid streams in different pumping flow directions. In each of the two functional mode operations 1) and 2), the two fluid streams are pumped to pass through different areas of the rotary type total heat exchange rotating disk (200), the flow paths of the two fluid streams are mutually isolated, and the flow directions of the two fluid streams are contrary to each other.

At least one temperature detecting device (11), at least one humidity detecting device (21), and at least one gaseous or liquid state fluid composition detecting device (31) are installed at positions capable of directly or indirectly detecting the temperature variation, humidity variation, or gaseous or liquid state fluid composition variation of the pumping exchange fluid, such that the temperature, humidity and composition detection signals are used as the references to determine the operating timing of the exchange fluid flow rate pumped by the double flow path fluid pumping device (123) operatively controlled by the operative control device (250) to 1) operatively control the flow rate of the exchange fluid pumped by the double flow path fluid pumping device (123); 2) operatively control the rotating speed of the rotary type total heat exchange rotating disk (200) driven by the rotating disk driving device (110); or 3) operatively control items 1) and 2) simultaneously.

The temperature detecting device (11), humidity detecting device (21) and gaseous or liquid state fluid composition detecting device (31) are integrally combined or individually separately installed.

The double flow path fluid pumping device (123) is constituted by at least two unidirectional fluid pumps (120a)(120b), wherein the fluid port (b) and fluid port (d) of the double flow path installed within the rotary type heat exchange apparatus (1000) are respectively installed with the unidirectional fluid pumps (120a)(120b) to constitute the double flow path fluid pumping device (123), and the operative control device (250) controls the flow rate of the heat exchange fluid pumped by the double fluid path fluid pumping device (123) when driven by the power source (300), and/or controls the rotating speed of the rotary type total heat exchange rotating disk (200) driven by the rotating disk rotationally driving device (110).

The power source (300) is an AC or DC city power system or an independent power supply device to provide power for the operation of the rotary type heat exchange apparatus with automatic exchange flow rate modulation.

The operative control device (250) is constituted by electromechanical components, solid state electronic components, or microprocessors, related software, and operative control interfaces to operatively control the unidirectional fluid pumps (120a)(120b) of the double flow path fluid pumping device (123) by: 1) operatively controlling the switching functional operation; 2) operatively controlling the flow rate of pumping heat exchange fluid; 3) operatively controlling the temperature distribution status between the fluid and the rotary type total heat exchange rotating disk (200); 4) operatively controlling the humidity distribution status of the rotary type total heat exchange rotating disk (200); 5) operatively controlling the composition interaction between the gaseous or liquid state fluids for heat exchange at the two sides of the rotary type heat exchange apparatus (1000); 6) operatively controlling the rotating speed of the rotary type total heat exchange rotating disk (200) driven by the rotating disk driving device (110); or 7) integrally controlling at least two of items 1), 2), 3), 4), 5) and 6) in combination.

The rotating disk rotationally driving device (110) is constituted by an electric motor or other rotational power source with a variable speed transmission device (111) for driving the rotary type total heat exchange rotating disk (200) to rotate and modulating its rotating speed to change its heat exchange characteristics.

The rotary type total heat exchange rotating disk (200) is rotationally driven by the rotating disk rotationally driving device (110) and internally provided with two porous fluid path areas for passing through different directional fluid flows. The rotating disk (200) has a heat absorbing or dissipating as well as a humidity absorbing or dissipating function, the two fluid paths of the rotary type total heat exchange rotating disk (200) individually extending between respective pairs of fluid ports for respectively pumping two fluid streams, the two fluid flow paths being mutually isolated, thereby allowing the fluids to pass in different flow directions through the rotary type total heat exchange rotating disk (200) while driven by the rotating disk rotationally driving device (110) for total heat exchange function operations.

The timing to operatively control the flow rate of heat exchange fluid and/or the rotating speed of rotary type total heat exchange rotating disk (200) driven by rotating disk rotationally driving device (110) may be established as follows: 1) the fluid flow rate and change timing are preset in the open loop operative control; 2) the timing is randomly manually controlled; or 3) at least one temperature detecting device (11), at least one humidity detecting device (21), or at least one gaseous or liquid state fluid composition detecting device (31) is installed at a position capable of directly or indirectly detecting the temperature variation, humidity variation, or gaseous or liquid state fluid composition variation of the pumping exchange fluid, wherein the temperature, humidity, and/or fluid composition signals are used as a reference to determine the operating timing for operatively controlling the flow rate of the pumping fluid or the rotating speed of the rotary type total heat exchange rotating disk (200) when driven by the rotating disk rotationally driving device (110).

The unidirectional fluid pump (120a) and unidirectional fluid pump (120b) can also be installed to the fluid ports (a)(d) or installed to the fluid ports (b)(c) in the embodiment of FIG. 7, such that one unidirectional fluid pump is pumped in positive pressure while the other unidirectional fluid pump is pumped in negative pressure so as to allow the two fluid streams to pass through the rotary type total heat exchange rotating disk (200) in different pumping flow directions.

The embodiment of FIG. 7 is further installed with a heater (130) in the fluid exchange flow path of the rotary type heat exchange rotating disk (200) to enhance dehumidification performance, the heater being actuated by electric energy or other temperature controllable heat generating sources.

In addition, the operative control device (250) may further refer to detected values output by the temperature detecting device (11), humidity detecting device (21), and/or gaseous or liquid state composition detecting device (31) to operatively control the heating timing and heating thermal energy value of the heater (130).

In the rotary type heat exchange apparatus with automatic flow rate exchange modulation of the present invention, the rotary type heat exchange rotating disk or the rotary type total heat exchange rotating disk may exhibit one or more than one of the following characteristics: 1) a tubular structure in a linear or other geometric shape; 2) a multi-layer structure constituted by gaseous or liquid state liquid fluid paths; or 3) one or more than one fluid path in series connection, parallel connection, or series and parallel connection.

The installation positions of temperature detecting device (11), humidity detecting device (21), and/or gaseous or liquid state fluid composition detecting device (31) include both or one of the positions near to fluid port (a) and fluid port (b), or both or one of the positions near to fluid port (c) and fluid port (d) of the rotary type heat exchange apparatus (1000), rotary type heat exchange rotating disk (100), or rotary type total heat exchange rotating disk (200), or e other positions capable of detecting the temperature, humidity or composition of the exchange fluid during heat exchange operation, and one or more than one of the detecting devices may provide detection signals for reference by one or more than one of the following functional operations: 1) for reference to operatively control the double flow path fluid pumping device (123) for modulating the flow speed or flow rate of the pumping fluid; or 2) for reference to operatively control the opening percentage of the fluid valve for modulating the flow speed or flow rate of the pumping fluid.

The temperature detecting device (11), humidity detecting device (21), and gaseous or liquid state fluid composition detecting device (31), may all be integrally combined, or part of the detecting devices may be integrally combined, or the detecting devices may all be individually separately installed.

The double flow path fluid pumping device (123) of the present invention constituted by two unidirectional fluid pumps (120a)(120b) is configured for pumping gaseous or liquid state fluids, and may be driven not only by individually installed electric motors or by a common electric motor, but also by engine power, or mechanical or electric power converted from wind power, thermal energy, temperature-difference energy, or solar energy.

The operative control device (250) of the present invention may be equipped with an electric motor, engine power, or mechanical or electric power generated or converted from wind power, thermal energy, temperature-difference energy, or solar energy for driving various unidirectional fluid pumps (120a)(120b) or the rotating disk rotationally driving device (110) Alternatively, the operative control device (250) may be capable of operatively controlling the operating timing of the fluid pumps or fluid valves, thereby changing the flow directions of the two fluid streams passing through the rotary type heat exchange rotating disk (100), or operatively controlling the rotating speed of the rotary type heat exchange rotating disk (100) or the rotary type total heat exchange rotating disk (200) driven by the rotating disk rotationally driving device (110), to further operatively control partial or all modulating functions of the rotating speed, flow rate, or fluid pressure of the fluid pumps.

The operative control device (250) may further operatively control the flow rate of the pumping fluid pumped by the double flow path fluid pumping device (123) and/or operatively control the rotating speed of the rotary type heat exchange rotating disk (100) or the rotary type total heat exchange rotating disk (200) according to one or more of the following operating modes, in which:

1) The adjustment or setting is manually controlled;
2) The operative control refers to a detection signal output by at least one installed temperature detecting device;
3) The operative control refers to a detection signal detected by at least one installed humidity detecting device;
4) The operative control refers to a signal detected by at least one installed gaseous or liquid state fluid composition detecting device;
5) The operative control is performed by combining two or more than two of operating modes 1) to 4).

In setting up the flow rate operative control function of the rotary type heat exchange apparatus with automatic flow rate exchange modulation of the present invention, the fluid flow rate operative control range may include stepped or stepless fluid flow rate modulations from a zero to a maximum transportation rate, and may further rely on one or more of the following to change the fluid flow rate, as follows:

1) operatively controlling the pumping rotating speed of the double flow path fluid pumping device (123) comprising two unidirectional fluid pumps (120*a*)(120*b*) within the range from zero to a maximum transportation rate to further operatively control the fluid flow rate;

2) operatively controlling the opening of controllable fluid inlet/outlet valves installed on the double flow path fluid pumping device (123) to further operatively control the fluid flow rate;

3) operatively controlling either of the controlled devices in items 1) and 2) to pump the fluid intermittently so as to modulate the average flow rate by the time ratio of pumping on/off.

The flow rate ratio between the two fluid streams of the rotary type heat exchange apparatus with automatic flow rate exchange modulation of the present invention that pass through the rotary type heat exchange apparatus (1000) during operation may include one or more than one of the following ratios:

1) The flow rate of fluid in one flow path is greater than the flow rate of fluid in the other flow path;

2) The flow rates of the fluids in both flow paths are the same;

3) Two fluid pumps with different pumping flow directions are alternatively operated to alternatively pump the two fluid streams in opposite flow directions;

In addition to the operating function of pumping fluids of the double flow path in different flow directions, the double flow path fluid pumping device (123) may be constituted by two fluid pumps capable of bidirectional pumping through operatively controlling the pumping flow directions of the two fluid streams to additionally provide one or more than one of the following special operating modes:

1) operatively controlling the fluids in two flow paths to be pumped in the same flow directions for pumping in fluids;

2) operatively controlling the fluids in two flow paths to be reversely pumped in the same flow directions for discharging fluids;

3) operatively controlling the fluids in two flow paths to be periodically pumped in positive and reverse flow directions for pumping in fluids in the same flow directions and discharging fluids in reverse flow directions.

The same directional pumping function of the two fluid streams can be applied to meet the needs for emergency additional fluid flow rate pumping in or out.

The invention claimed is:

1. A heat exchange system with automatic flow rate exchange modulation, comprising:

a heat exchange apparatus (1000) including a heat exchange rotating disk (100 or 200) and two mutually isolated internal flow paths through which at least a first heat exchange fluid is respectively pumped in a first direction and at least a second heat exchange fluid is respectively pumped in a second direction opposite the first direction, said heat exchange apparatus having four fluid ports (a,b,c,d) through which the first and second heat exchange fluids are pumped into and out of the heat exchange apparatus, wherein said rotating disk (100 or 200) is driven by a rotating disk driving device (110), said rotating disk (100 or 200) includes two porous fluid areas through which said first and second heat exchange fluids in the internal flow paths flow respectively in said first and second directions, and said rotating disk (100 or 200) is made of a heat absorbing or dissipating material that absorbs or dissipates heat carried by said first and second heat exchange fluids as they pass through the rotating disk (100 or 200), said rotating disk thereby causing heat exchange between said first and second heat exchange fluids;

at least two fluid pumps (120*a*,120*b*) for respectively pumping the first and second heat exchange fluids in said first direction through the heat exchange apparatus and in said second direction opposite the first direction through the heat exchange apparatus (1000);

a power source (300) for supplying power to the at least two fluid pumps (120*a*,120*b*);

an operative control device (250) for controlling said heat exchange between the first and second heat exchange fluids by operatively controlling at least one of a (a) a flow rate of at least one of the first and second heat exchange fluids, and (b) a rotating speed of the rotating disk (100 or 200); and at least one gaseous or liquid state fluid composition detecting device (31) installed at a position to detect a fluid composition variation within the heat exchange apparatus, wherein the gaseous or liquid state fluid composition detecting device (31) provides fluid composition detecting signals to said operative control device (250) for use as a reference to operatively control an inflow status of one of said first and second heat exchange fluids.

2. The heat exchange system claimed in claim 1, further comprising at least one temperature detecting device (11) installed at a position to detect a temperature variation of a respective one of said first and second heat exchange fluids, wherein the at least one temperature detecting device provides temperature detecting signals to said operative control device (250) to control said at least one of said flow rate and rotating speed by using said temperature detecting signals as a reference.

3. The heat exchange system claimed in claim 2, further comprising at least one humidity detecting device (21) installed at a position to detect a humidity variation of a respective one of said first and second heat exchange fluids when a state of said respective one of said first and second heat exchange fluids at said position is gaseous, wherein the at least one humidity detecting device provides humidity detecting signals to said operative control device (250) to control said at least one of said flow rate and rotating speed by using said humidity detecting signals as a reference.

4. The heat exchange system claimed in claim 3, wherein said operative control device (250) controls said at least one of said flow rate and rotating speed by operatively controlling said pumps.

5. The heat exchange system as claimed in claim 3, wherein said at least two fluid pumps are unidirectional pumps and are operated in one of three modes: a mode in which said unidirectional pumps are operated to generate positive pressure, a mode in which said unidirectional pumps are operated to generate negative pressure, and a mode in which at least one of said unidirectional pumps is operated to generate positive pressure and at least one of said unidirectional pumps is operated to generate negative pressure.

6. The heat exchange system as claimed in claim 3, wherein the at least two fluid pumps (111,112 or 120*a*,120*b*,120*c*, 120*d*) are operatively controlled by the operative control device (250) according to at least one of the following operative control modes:

(a) a mode in which adjustment or setting of the flow rate is manually controlled;

(b) a mode in which the flow rate is operatively controlled by referring to a signal detected by said at least one temperature detecting device;

(c) a mode in which the flow rate is operatively controlled by referring to a signal detected by said at least one humidity detecting device;

(d) a mode in which the flow rate is operatively controlled by referring to a signal detected by said at least one gaseous or liquid state fluid composition detecting device; and (e) a mode which is a combination of at least two of said modes (a) to (d).

7. The heat exchange system as claimed in claim 3, wherein said rotating disk driving device (110) supplies power to said rotating disk (100 or 200) under control of said operative control device (250).

8. The heat exchange system as claimed in claim 3, wherein said two porous fluid areas of said rotating disk (100 or 200) include respective apertures for passage of said first and second heat exchange fluids.

9. The heat exchange system as claimed in claim 3, wherein said rotating disk (100 or 200) has one of a humidity absorbing property for absorbing humidity and a humidity dissipating property for dissipating humidity when a respective one of said first and second heat exchange fluids is in a gaseous state.

10. The heat exchange system claimed in claim 1, further comprising at least one humidity detecting device (21) installed at a position to detect a humidity variation of a respective one of said first and second heat exchange fluids when a state of said respective one of said first and second heat exchange fluids at said position is gaseous, wherein the at least one humidity detecting device provides humidity detecting signals to said operative control device (250) to control said at least one of said flow rate and rotating speed by using said humidity detecting signals as a reference.

11. The heat exchange system claimed in claim 1, wherein said operative control device (250) controls said at least one of said flow rate and rotating speed by operatively controlling at least one of said at least two fluid pumps.

12. The heat exchange system as claimed in claim 1, wherein said rotating disk (100 or 200) has one of a humidity absorbing property for absorbing humidity and a humidity dissipating property for dissipating humidity when a respective one of said first and second heat exchange fluids, is in a gaseous state.

13. The heat exchange system as claimed in claim 1, wherein said rotating disk driving device (110) supplies power to said rotating disk (100 or 200) under control of said operative control device (250).

14. The heat exchange system as claimed in claim 1, wherein said two porous fluid areas of said rotating disk (100 or 200) include respective apertures for passage of said first and second heat exchange fluids.

15. The heat exchange system as claimed in claim 1, wherein the flow rate of a respective one of said first and second heat exchange fluids in one of said fluid flow paths is controlled to be greater than the flow rate of the other one of said first and second heat exchange fluids in the other of said fluid flow paths in a first mode; and the flow rate of the respective one of said heat exchange fluids is controlled to be the same as the flow rate of the other one of said heat exchange fluids in a second mode.

16. The heat exchange system as claimed in claim 1, wherein said at least two fluid pumps are arranged to operate in at least one of the following modes: a mode in which said first and second fluids are pumped into said heat exchange apparatus, a mode in which said first and second fluids are reversely pumped out of said heat exchange apparatus, and a mode in which said first and second fluids are periodically pumped into and out of said heat exchange apparatus in respectively reversed flow directions.

* * * * *